March 23, 1965
R. D. HAWKINS
3,174,740
SHOCK AND VIBRATION ISOLATING ASSEMBLY
Filed Dec. 28, 1962
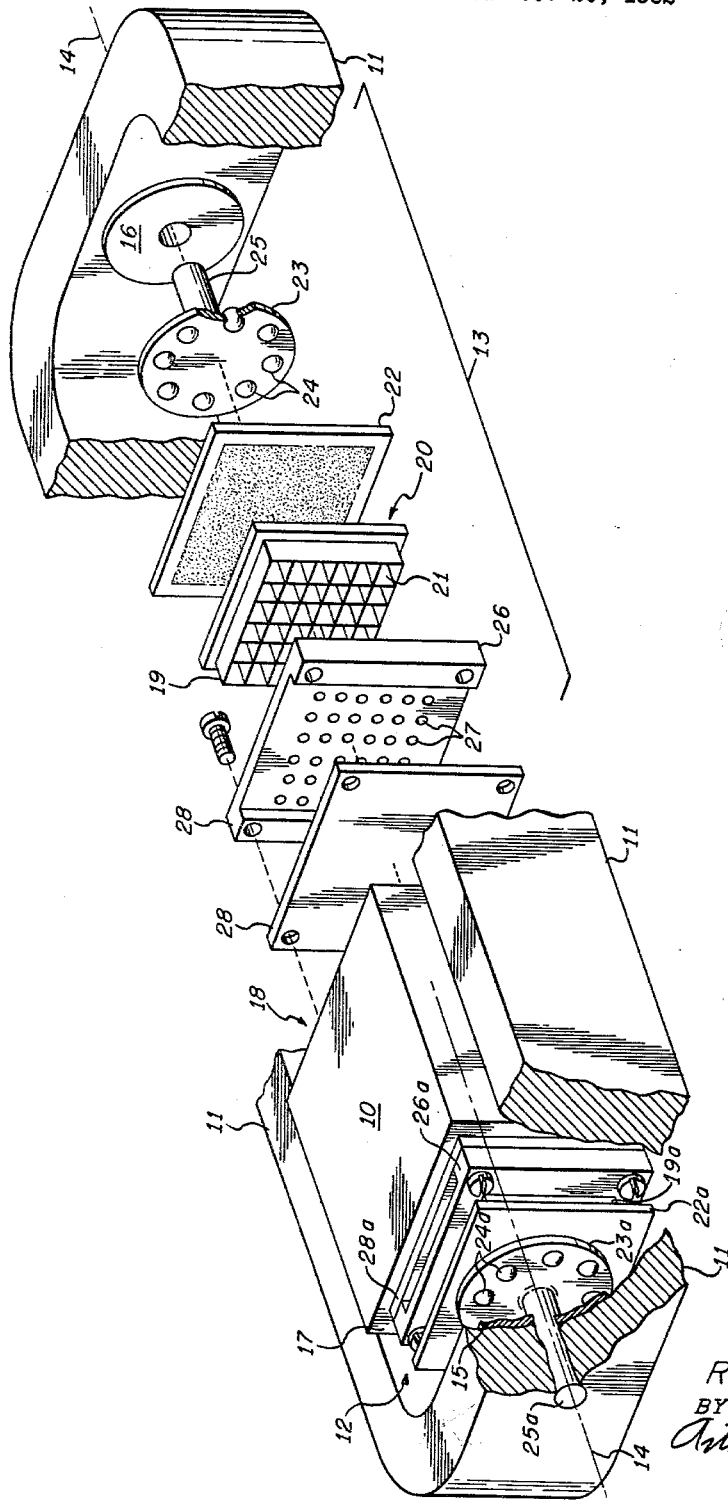
INVENTOR.
ROBERT D. HAWKINS
BY
Arthur H. Serrell
ATTORNEY

3,174,740
SHOCK AND VIBRATION ISOLATING ASSEMBLY

Robert D. Hawkins, Greenlawn, N.Y., assignor to Sperry Rand Corporation, Great Neck, N.Y., a corporation of Delaware
Filed Dec. 28, 1962, Ser. No. 247,898
7 Claims. (Cl. 267—1)

This invention relates to an assembly of the shock and vibration isolating type for coupling two related bodies so that one is relatively free of the vibrations of the other. The assembly includes an isolator of resilient material with non-linear spring characteristics, an air damping structure and a ball bearing structure. The returnability of the isolator component of the assembly is improved by the related air damping and ball bearing structures without impairment of its coupling characteristics.

A high degree of ability of an isolator to return to its static or normal load condition when dynamic or abnormal loads are removed is required in instruments such as stable platforms where the isolators are employed between relatively movable parts. Good returnability is a characteristic of the improved assembly where the provided isolator is particularly of the egg crate pattern type shown and described in my issued U.S. Letters Patent No. 3,049,344 of August 14, 1962. In use, pairs of assemblies with their respective isolators in opposed compressive relation are located between the coupled parts for each axis or plane of vibration. Only components of vibration that are directed along a coupling axis or perpendicular to a plane normal to the axis exert compressive influence on the isolators.

An object of the present invention is to provide a uniaxis assembly of the character described having an isolator with low transmissibility and high returnability characteristics that performs in a wide range of vibrating frequencies including resonant frequency.

One of the features of the invention is provided by the air damping structure included in the assembly.

Another of the features of the invention is provided by the ball bearing structure included in the assembly.

Further objects, features, and structural details of the improved coupling assembly will be apparent from the following description when read in relation to the accompanying drawing showing a perspective view of two of the assemblies providing single axis isolation for two coupled bodies where the elements of one of the assemblies are represented in exploded relation and the elements of the opposing assembly are represented in contiguous relation.

In the illustrative arrangement shown in the drawing for single axis isolation, the isolated bodies are respectively indicated at 10 and 11 and the axially spaced assemblies are generally indicated at 12 and 13. Body 10 is indicated as a rigid platform component that is isolated by the assemblies 12 and 13 from the vibrations of the adjacent second rigid body 11 indicated as a frame that encircles the platform. The coupling axis of the assembly is indicated at 14. Axis 14 is normally horizontal. As represented, axis 14 is one of three orthogonal axes of support for the platform 10. To avoid unnecessary duplication of parts in the drawing, the other axes of the platform 10 are not shown. As shown, the vibrating body 11 includes two axially bored planar surfaces 15 and 16 in the form of rigid flat bearing plates in the respective assemblies 12 and 13 that are normal to the axis 14. The opposite rigid planar surfaces 17 and 18 of the body 10 are normally perpendicular to axis 14 and parallel and adjacent to the related planar surfaces 15 and 16 of the body 11. In this provided arrangement, coupling assembly 12 is sandwiched between the axially spaced surfaces 15 and 17 and coupling assembly 13 is sandwiched between the axially spaced surfaces 16 and 18.

The elements of the respective assemblies 12 and 13 are of identical structure. As shown, the compressible part of the assembly 13 is a vibration and shock isolator 19 of resilient material such as rubber having respective opposite planar surfaces. Isolator 19 is preferably a unitary piece of rubber of the character shown in U.S. Letters Patent No. 3,049,344 having an egg crate type cell pattern of buckling walls with a closed planar surface 20 and an open planar surface 21. The related isolator for assembly 12 is indicated at 19a. The dimensions of the compressible isolators and the size and angular disposition of the walls of the pattern are design variables that are necessarily chosen to provide the best performance for a specific environment, load and frequency range of operation. An uncompressible component of assembly 13 is provided by a rigid flat bearing plate 22, one of whose planar surfaces is connected to the closed planar surface 20 of isolator 19 by a suitable cement, or other means of attachment. The matching component in assembly 12 is indicated at 22a. The bearing structure of assembly 13 further includes a movable cage 23 with ball bearings 24 arranged between the other of the surfaces of plate 22 and the plate 16 to maintain the respective plates in equidistantly spaced planar relationship. A stub shaft 25 connected to the cage 23 fits the bore in the plate 16 and body 11 so that the cage is free to move about the axis 14 in relation to body 11. The balls 24 contact the respective plates 22 and 16 and determine the fixed axial spacing provided by assembly 13. The corresponding cage, balls and shaft components for the assembly 12 are respectively indicated at 23a, 24a and 25a. The bearing structure provided improves the returnability of the assembly as it rejects all components of vibrational loading that are not directed along the coupling axis 14 or perpendicular to a plane normal to the axis. This result is obtained in the improved coupling assembly as the ball bearings 24 of cage 23 contact the respective planar surfaces of the bearing plate 22 and vibratory body 11 in unrestrained perpendicular relation to the axis 14. The isolators 19 and 19a accordingly do not experience any vibration loading normal to or about axis 14.

The air damping structure provided in assembly 13 includes a rigid flat cover 26 that is connected to the open planar surface of the isolating piece 19 by suitable cement, or other means of attachment. Perforations 27 are included in the cover 26 for each of the cells of the isolator 19. The perforation 27 provides damping through the flow of air into and out of each individual cell of the isolator 19. The cover 26, isolator 19 and bearing plate 22 of the assembly 13 are preferably connected as a unit to the planar surface 18 of body 10 through a mounting plate 28 and suitable screw fastening means. The related components for the assembly 12 are indicated as cover 26a and mounting plate 28a. The isolators 19 and 19a being sandwiched between the planar surface of the bodies 10 and 11 are arranged to operate independently in compression only depending on the direction along axis 14 that the vibratory load occurs in. One or the other of the isolators is accordingly always effective to return the body 10 to a null position with respect to the axis 14 and body 11.

In operation, the isolators function with the characteristics of a non-linear spring. Under compressive loading, the walls of the cell of the isolator which are naturally stiff buckle and become softer. Under further compressive loading, the isolators bottom out and again become stiff. The soft spring region is effective in limiting magnification of inputs at the natural frequency of the isolator because it changes the frequency as the vibrations build up. Magnifications of motion at resonant frequency vibration are limited by the non-linear spring characteristics of the isolators as well as by the energy losses caused by the passing of air through the perforations in the cover parts of the assemblies and the inherent damping within the material of the isolators.

While the invention has been described in its preferred embodiment, it is understood that the words which have been used are words of description rather than of limitation and that changes within the purview of the appended claims may be made without departing from the true scope and spirit of the invention in its broader aspects.

What is claimed is:

1. In an assembly for coupling a vibratory body with a rigid planar surface and a body with a second rigid planar surface adjacent and normally parallel to the planar surface of the vibratory body along an axis perpendicular to the surfaces, a vibration and shock isolator of resilient material having respective planar surfaces one of which is connected to the planar surface of the second body, a rigid flat bearing plate having respective planar surfaces one of which is connected to the other of the planar surfaces of the isolator, and a cage with ball bearings thereon contacting the other of the planar surfaces of the bearing plate and the planar surface of the vibratory body in unrestrained perpendicular relation to the axis, the assembly being sandwiched between the surfaces of the respective bodies with the bearings of the cage between the planar surface of the vibratory body and the bearing plate to maintain the isolator in equidistantly spaced planar relation to the vibratory body along the axis.

2. An assembly of the character claimed in claim 1, in which the isolator is a unitary piece of rubber having an egg crate type cell pattern of buckling walls.

3. An assembly of the character claimed in claim 2, in which the other of the planar surfaces of the cell pattern is closed and the one of the planar surfaces is open.

4. An assembly of the character claimed in claim 3, having a rigid flat perforated plate connected to the open planar surface of the isolator to provide air damping for the coupling.

5. An assembly for coupling a vibratory body with a rigid planar surface and a body with a second rigid planar surface adjacent and normally parallel to the planar surface of the vibratory body comprising a compressible part including a unitary piece of rubber having an egg crate type cell pattern of buckling walls with a closed planar surface and an open planar surface, a rigid flat cover connected to the open planar surface of the piece having perforations therein to provide air damping for the coupling; an uncompressible part including a rigid flat bearing plate having a planar surface connected to the closed planar surface of the piece and a second planar surface, and a cage with ball bearings therein contacting the second planar surface of the bearing plate, the assembly being sandwiched between the surfaces of the respective bodies with the cover against one of the bodies and the bearings of the cage contacting the other of the planar body surfaces to maintain the bearing plate in equidistantly spaced planar relation therewith.

6. In a coupling assembly of the character described, a vibratory body having a rigid planar surface, a unitary piece of compressible material having an egg crate type cell pattern of buckling walls with a planar surface, a rigid flat bearing plate having a planar surface connected to the planar surface of the piece, and a cage with ball bearings between the planar surface of the vibratory body and the flat bearing plate for maintaining the piece in equidistantly spaced planar relation to the body.

7. In an axial coupling assembly of the character described, a vibratory body having a rigid planar surface normally perpendicular to the axis, a vibration and shock isolator of resilient material having a planar surface normally perpendicular to the axis, a rigid flat bearing plate having a planar surface connected to the planar surface of the isolator, and a cage with ball bearings connecting the planar surface of the vibratory body and the flat bearing plate in unrestrained perpendicular relation to the axis to maintain the isolator in equidistantly spaced planar relation to the body.

References Cited by the Examiner

UNITED STATES PATENTS

| 2,159,520 | 5/39 | Chapman | 267—1 |
| 2,179,148 | 11/39 | Gerlofson | 267—1 |
| 2,750,996 | 6/56 | Cramer | 267—1 |
| 3,049,344 | 8/62 | Hawkins | 267—1 |
| 3,058,790 | 10/62 | Hammerand | 308—227 |

FOREIGN PATENTS 732,457    3/43    Germany.

ARTHUR L. LA POINT, *Primary Examiner.*